United States Patent [19]

Yoneda et al.

[11] Patent Number: 4,916,639

[45] Date of Patent: Apr. 10, 1990

[54] DATA INPUT-OUTPUT DEVICE FOR INTERACTIVE NUMERICAL CONTROLLER

[75] Inventors: Takao Yoneda, Nagoya; Yasuji Sakakibara, Hekinan; Shoji Ikawa, Okazaki; Yasunori Sugito, Nagoya, all of Japan

[73] Assignee: Toyoda Koki Kabushiki Kaisha, Kariya, Japan

[21] Appl. No.: 264,395

[22] Filed: Oct. 31, 1988

[30] Foreign Application Priority Data

Oct. 31, 1987 [JP] Japan .................................. 62-277228

[51] Int. Cl.$^4$ ............................................. G06F 15/00
[52] U.S. Cl. ................................ 364/474.22; 364/192
[58] Field of Search ................... 364/474.22, 191, 192, 364/146, 709.05

[56] References Cited

U.S. PATENT DOCUMENTS 4,521,845 6/1985 Schwefel ........................ 364/474.22
4,648,025 3/1987 Yoneda et al. ...................... 364/474

Primary Examiner—Allen MacDonald
Attorney, Agent, or Firm—Oblon, Spivak, McClelland, Maier & Neustadt

[57] ABSTRACT

A data input-output device for an interactive numerical controller includes a key board having a set of numerical keys arranged to input data used for machining operations of a machine tool into a memory device, a first group of selection keys in the form of normal operation keys arranged to correct the input data in accordance with a workpiece to be machined, a second group of selection keys in the form of set-up change keys arranged to change process management data of the machining operations, a mode switch arranged to instruct the operation of the numerical controller, and a permission switch arranged to be turned on only by using an authorized key, and a central processing unit programmed to disable data input by manipulation of the second group of selection keys in a condition where the first group of selection keys is being manipulated and to permit the data input by manipulation of the second group of selection keys in a condition where the permission switch is turned on after the mode switch has been set in an input position under an inoperative condition of the first group of selection keys.

3 Claims, 3 Drawing Sheets

DATA INPUT-OUTPUT DEVICE FOR INTERACTIVE NUMERICAL CONTROLLER

BACKGROUND OF THE INVENTION

1. Field of the Invention

The present invention relates to an interactive numerical controller for a machine tool such as a grinding wheel, and more particularly to a data input-output device for the numerical controller to input data necessary for numerical control of the machine tool into a memory device of the numerical controller in dependence upon an instruction image selectively displayed on a display device in accordance with a numerical control program stored in the memory device.

2. Discussion of the Background

In such an interactive numerical controller for a machine tool as described above, a memory device is provided to store various numerical control programs such as a program for execution of machining operations, a program for monitoring operating conditions of the machine tool and the like. The data input procedure to the control programs is carried out by an input-output device which includes a selector switch arranged to call out instructin images from the memory device and a display device having a display screen such as a CRT screen for displaying the instruction images thereon. The input data in the programs include those which are to remain without any change and those to be newly input or changed by an operator. For instance, dimension and position data for various workpieces are changed by an operator during the data input procedure to the program for execution of machining operations, while process management data of the machining operations are changed by another operator for each manufacturing process of the workpieces. If the process management data were called out by an error in operation of the selector switch at the input procedure of the dimension and position data, undesired data would be input to cause unexpected change of the process management data.

SUMMARY OF THE INVENTION

It is, therefore, an object of the present invention to provide an improved data input-output device for the numerical controller capable of reliably avoiding unexpected change of the process management data in the control programs.

According to the present invention, the object is attained by providing a data input-output device which includes a key board having a set of numerical keys arranged to input data used for machining operations of the machine tool into the memory device, a first group of selection keys in the form of normal operation keys arranged to correct the input data in accordance with a workpiece to be machined, a second group of selection keys in the form of set-up change keys arranged to change process management data of the machining operations, a mode switch arranged to instruct the operation of the numerical controller, and a permission switch arranged to be turned on only by using an authorized key, and a central processing unit programmed to disable data input by manipulation of the second group of selection keys in a condition where the first group of selection keys is being manipulated and to permit the data input by manipulation of the second group of selection keys in a condition where the permission switch is being turned on after the mode switch has been set in an input position under an inoperative condition of the first group of selection keys.

BRIEF DESCRIPTION OF THE DRAWINGS

The foregoing and other objects, features and advantages of the present invention will be more readily appreciated from the following detailed description of a preferred embodiment thereof when considered with reference to the accompanying drawings, in which.

DESCRIPTION OF THE PREFERRED EMBODIMENT

Figure 1:
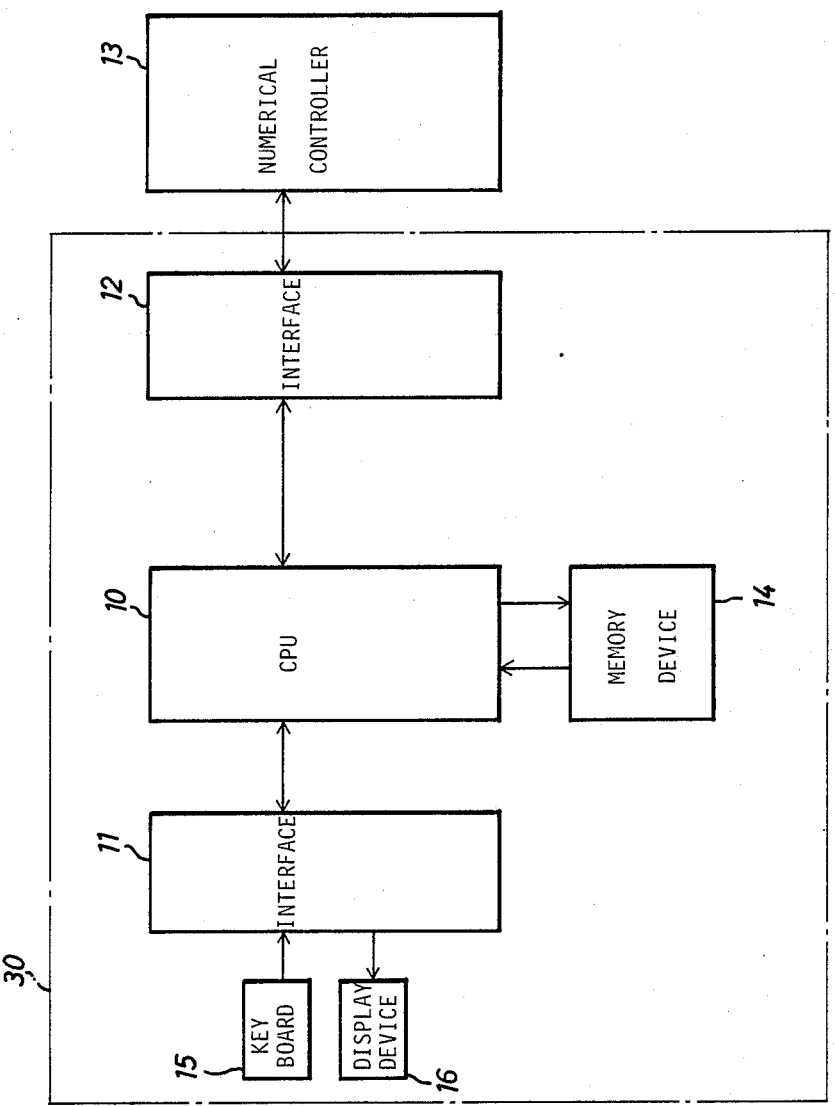
FIG. 1 is a block diagram of a data input-output device for a numerical controller.

In FIG. 1 of the drawings, there is illustrated a data input-output device 30 for a numerical controller 13 which includes a central processing unit 10 (hereafter referred to as "CPU") connected to a memory device 14 and to a key board 15 and a display device 16 through an interface 11. The numerical controller 13 is connected to the CPU 10 through an interface 12 to be applied with control signals from the CPU 10. The memory device 14 is arranged to store a series of numerical control programs for selectively displaying on the display device 16 various instruction images for instruction of data input, information for machining operations and the like, a whole-menu image corresponding with selection keys, instruction-menu images classified according to the selection keys and for exchange of data with the numerical controller 13. Thus, the numerical controller 13 is arranged to control a machine tool (not shown) in accordance with the numerical control programs stored in the memory device 14.

Figure 2:
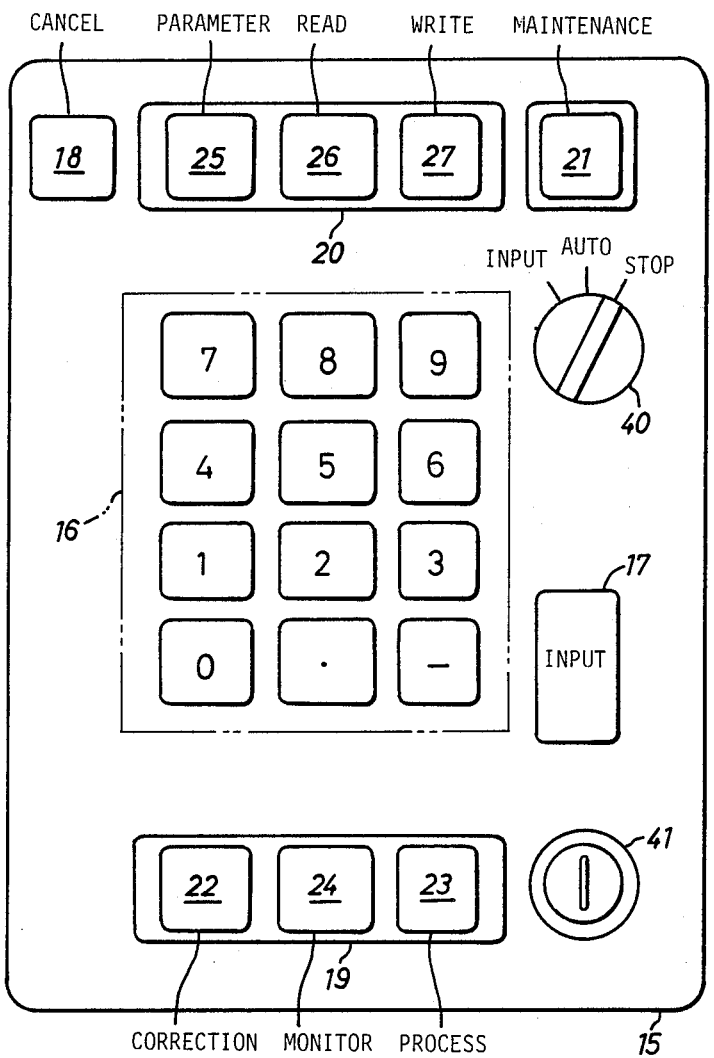
FIG. 2 is a plan view of a key board adapted to the input-output device shown in FIG. 1.

As shown in FIG. 2, the key board 15 is provided thereon with numerical keys 16 for data input and selection of the instruction images, an input key 17 for instructing the CPU 10 concerning the entry of input data, a mode switch 40 for instructing the operation of numerical controller 13, and a permission switch 41 for permitting input of process management data selected by manipulation of a group of set-up change keys 20 only when it has been turned on by using an authorized key (not shown). The key board 15 is further provided thereon with a cancel key 18 for calling out the whole-menu image to be displayed on the display device, a group of normal operation keys 19 classified according to operators, the group of set-up change keys 20 and a maintenance key 21. The group of normal operation keys 19 includes a correction key 22 for correcting dimension data for normal machining operations in accordance with a workpiece to be machined, a process key 23 for calling out the instruction image indicative of a sequence of procedures for e.g., tool change, and a monitor key 24 for monitoring operating conditions of the machine tool. The group of set-change keys 20 includes a parameter key 25 for calling out the instruction image of process management data for change of the machining processes, a read key 26 for reading data from an external memory (not shown), and a write key 27 for writing data into the external memory.

Figure 3:
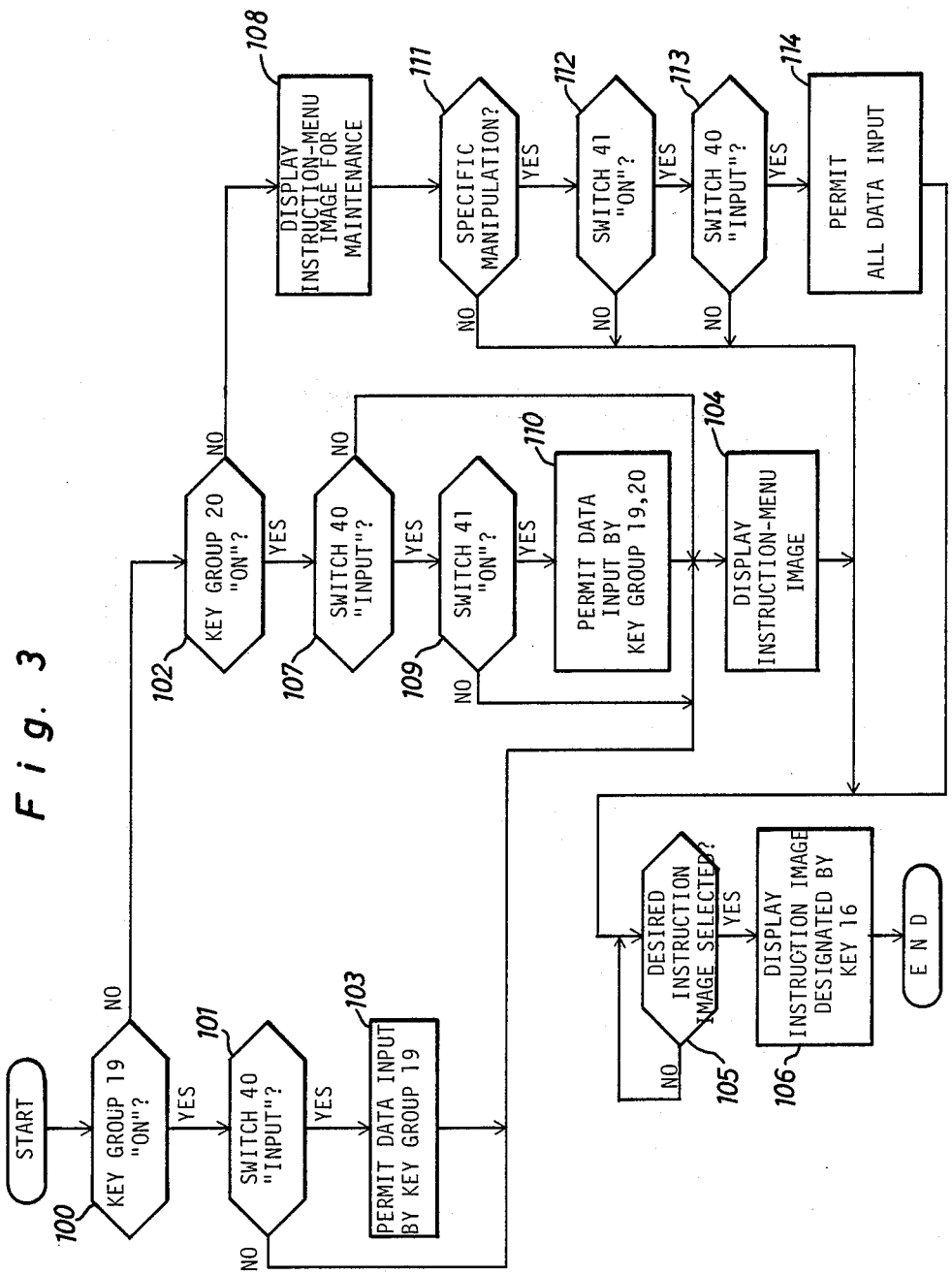
FIG. 3 is a flow chart of a system program executed by a central processing unit of the input-output device shown in FIG. 1.

FIG. 3 illustrates a flow chart of a system program stored in the memory device 14 for avoiding unexpected change of the process management data in the control programs previously stored in the memory device. In this preferred embodiment, the CPU 10 is programmed to execute the system program at each time the selection keys in the form of normal operation keys 19 and set-up change keys 20 are manipulated, as will be described hereinafter. In step 100 of the system program, the CPU 10 ascertains whether any one of the group of normal operation keys 19 has been manipulated or not. When the answer is "Yes", the program proceeds to step 101 where the CPU 10 ascertains whether the mode switch 40 has been set in an input position. If the answer is "Yes", the program will proceed to step 103 where the CPU 10 implements the group of normal operation keys 19 in force or valid and causes the program to proceed to step 104. If the answer in step 101 is "No", the CPU 10 will cause the program to proceed to step 104.

In step 104 of the program, the CPU 10 causes the display device 16 to display thereon one of the instruction-menu images selected by manipulation of one of the group of normal operation keys 19 and causes the program to proceed to step 105. In step 105, the CPU 10 ascertains whether desired instruction images have been selected by the numerical keys 16 or not. When the answer in step 105 becomes "Yes", the program proceeds to step 106 where the CPU 10 causes the display device 16 to display thereon the instruction image designated by the numerical keys 16 and ends the execution of the program.

When the answer in step 100 is "No", the program proceeds to step 102 where the CPU 10 ascertains whether any one of the group of set-up change keys 20 has been manipulated or not. If the answer is "Yes", the program will proceed to step 107 where the CPU 10 ascertains whether the mode switch 40 has been set in the input position or not. If the answer in step 107 is "Yes", the program will proceed to step 109 where the CPU 10 ascertains whether or not the permission key 41 has been turned on by using the authorized key. If the answer in step 109 is "Yes", the program will proceed to step 110 where the CPU 10 implements the groups of normal keys 19 and set-up change keys 20 in force or valid and causes the program to proceed to step 104. If the answer in step 107 or 109 is "No", the program will proceed to step 104.

When the answer in step 102 is "No", the program proceeds to step 108 where the CPU 10 causes the display device 16 to display thereon the instruction-menu image for maintenance selected by the maintenance key 21. When the program proceeds to step 111, the CPU 10 ascertains whether or not the numerical keys 16 have been manipulated in such a particular manner that for example, the numerical keys 16 are depressed with the input key 17 being depressed at the same time. If the answer in step 111 is "Yes", the program will proceed to step 112 where the CPU 10 ascertains whether or not the permission switch 41 has been turned on by using the authorized key. If the answer in step 112 is "Yes", the program will proceed to step 113 where the CPU 10 ascertains whether or not the mode switch 40 has been set in the input position. If the answer in step 113 is "Yes", the program will proceed to step 114 where the CPU 10 implements all the input keys in force or valid and causes the program to proceed to step 105. If the answer in step 111, 112 or 113 is "No", the CPU 10 will cause the program to proceed to step 105.

Thus, the execution of the system program is available to disable data input by manipulation of the group of set-up change keys 20 in a condition where the group of normal operation keys 19 is being manipulated after the mode switch 40 has been set in the input position and to permit the data input by manipulation of the group of set-up change keys 20 only in a condition where the permission switch 41 is being turned on after the mode switch 40 has been set in the input position. The execution of the system program is further available to permit data input by manipulation of all the selection keys only when the numerical keys 16 have been manipulated in the aforementioned particular manner.

Having now fully set forth a preferred embodiment of the concept underlying the present invention, various other embodiments and variations and modifications of the embodiment herein shown and described will obviously occur to those skilled in the art upon becoming familiar with said underlying concept. It is to be understood, therefore, that within the scope of the appended claims, the present invention may be practiced otherwise than as specifically set forth herein.

What is claimed is:

1. A data input-output device for an interactive numerical controller which enables an operator to input data necessary for numerical control of a machine tool into a memory device in dependence upon an instruction image selectively displayed on a display device in accordance with a numerical control program stored in the memory device, the data input-output device comprising:

input means having a set of numerical keys arranged to input data used for machining operations of said machine tool into said memory device, a first group of selection keys arranged to correct the input data in accordance with a workpiece to be machined, a second group of selection keys arranged to change process management data of the machining operations, a mode switch arranged to instruct the operation of said numerical controller, and a permission switch arranged to be turned on only by using an authorized key; and means for disabling data input by manipulation of said second group of selection keys in a condition where said first group of selection keys is being manipulated and for permitting the data input by manipulation of said second group of selection keys in a condition where said permission switch is being turned on after said mode key has been set in an input position under an inoperative condition of said first group of selection keys.

2. A data input-output device for an interactive numerical controller which enables an operator to input data necessary for numerical control of a machine tool into a memory device in dependence upon an instruction image selectively displayed on a display device in accordance with a numerical control program stored in the memory device, the data input-output device comprising:

input means having a set of numerical keys arranged to input data used for machining operations of said machine tool into said memory device, a first group of selection keys arranged to correct the input data in accordance with a workpiece to be machined, and a second group of selection keys arranged to change process management data of the machining operations; and means for disabling data input by manipulation of said second group of selection keys in a condition where said first group of selection keys is being manipulated and for permitting the data input by manipulation of said second group of selection keys when said numerical keys have been manipulated in a particular manner under an inoperative condition of said first group of selection keys.

3. A data input-output device for an interactive numerical controller which enables an operator to input data necessary for numerical control of a machine tool into a memory device in dependence upon an instruction image selectively displayed on a display device in accordance with a numerical control program stored in the memory device, the data input-output device comprising:

input means having a set of numerical keys arranged to input data used for machining operations of said machine tool into said memory device, a first group of selection keys arranged to correct the input data in accordance with a workpiece to be machined, a second group of selection keys arranged to change process management data of the machining operations, and a permission switch arranged to be turned on only by using an authorized key; and means for disabling data input by manipulation of said second group of selection keys in a condition where said first group of selection keys is being manipulated and for permitting the data input by manipulation of said second group of selection keys in a condition where said permission switch is being turned on after said numerical keys have been manipulated in a particular manner under an inoperative condition of said first group of selection keys.

* * * * *